(12) United States Patent
Doan Huu et al.

(10) Patent No.: US 12,159,240 B2
(45) Date of Patent: Dec. 3, 2024

(54) DETERMINING COMPONENT CONTRIBUTIONS OF TIME-SERIES MODEL

(71) Applicant: BUSINESS OBJECTS SOFTWARE LTD., Dublin (IE)

(72) Inventors: Jacques Doan Huu, Montigny le Bretonneux (FR); Elouan Argouarch, Dublin (IE)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 899 days.

(21) Appl. No.: 17/233,600

(22) Filed: Apr. 19, 2021

(65) Prior Publication Data
US 2022/0335314 A1    Oct. 20, 2022

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC ........................................................ G06N 5/04
USPC ...................................................... 706/11
See application file for complete search history.

(56) References Cited

U.S. PATENT DOCUMENTS

| | | | | |
|---|---|---|---|---|
| 9,799,218 | B1 * | 10/2017 | Gordon | B60W 40/08 |
| 10,866,341 | B2 * | 12/2020 | Kakimoto | G01W 1/10 |
| 11,022,720 | B2 * | 6/2021 | Sarwat | G06N 3/006 |
| 11,062,337 | B1 * | 7/2021 | Ross | G06Q 30/02 |
| 11,062,378 | B1 * | 7/2021 | Ross | G06Q 30/01 |
| 11,100,524 | B1 * | 8/2021 | Ross | G06N 7/00 |
| 11,455,550 | B2 * | 9/2022 | Bardini | G06Q 10/20 |
| 11,468,384 | B2 * | 10/2022 | Kulkarni | G06F 17/18 |
| 11,580,842 | B1 * | 2/2023 | Hauser | G08B 21/182 |
| 11,853,915 | B1 * | 12/2023 | Wojchouski | G06Q 50/06 |
| 11,875,368 | B2 * | 1/2024 | Kansara | G06Q 30/0202 |
| 12,020,265 | B1 * | 6/2024 | Mao | G06F 40/30 |
| 2014/0309977 | A1 * | 10/2014 | Kamarianakis | G08G 1/0129 703/6 |
| 2015/0112636 | A1 * | 4/2015 | Grichnik | G06F 17/18 702/180 |
| 2015/0205695 | A1 * | 7/2015 | Sengupta | G06F 11/3409 707/688 |
| 2015/0220577 | A1 * | 8/2015 | Sengupta | G06Q 10/06 707/758 |
| 2016/0247069 | A1 * | 8/2016 | Baughman | G06N 20/00 |
| 2017/0124490 | A1 * | 5/2017 | Crabtree | G06Q 10/063 |
| 2018/0196900 | A1 * | 7/2018 | Weissman | G06F 30/20 |
| 2018/0225027 | A1 * | 8/2018 | Cooke | G06F 3/04842 |
| 2018/0293502 | A1 * | 10/2018 | Sengupta | G06Q 10/067 |
| 2019/0188611 | A1 * | 6/2019 | Wu | G06Q 10/04 |

(Continued)

Primary Examiner — Reza Nabi
(74) Attorney, Agent, or Firm — Buckley, Maschoff & Talwalkar LLC

(57) ABSTRACT

Provided is a system and method which decomposes a predicted output signal of a time-series forecasting model into a plurality of sub signals that correspond to a plurality of components, and determines and displays a global contribution of each component. In one example, the method may include iteratively predicting an output signal of a time-series data value via execution of a time-series model, decomposing the predicted output signal into a plurality of component signals corresponding to a plurality of components of the time-series machine learning algorithm, respectively, and displaying the plurality of global values via a user interface.

15 Claims, 8 Drawing Sheets

(56) References Cited

U.S. PATENT DOCUMENTS

| | | | | |
|---|---|---|---|---|
| 2020/0098055 A1* | 3/2020 | O'Hara | ............. | G06Q 30/0202 |
| 2020/0143252 A1* | 5/2020 | Dasgupta | ............... | G06N 20/10 |
| 2020/0342379 A1* | 10/2020 | Phillips | ............ | G06Q 10/06314 |
| 2020/0380541 A1* | 12/2020 | Laing | ................. | G06Q 30/0244 |
| 2021/0150623 A1* | 5/2021 | Rostami | ............. | G06Q 20/3676 |
| 2022/0012609 A1* | 1/2022 | Gormally | ............... | G06Q 10/04 |
| 2022/0058499 A1* | 2/2022 | Amzal | ................... | G06N 20/00 |
| 2022/0083897 A1* | 3/2022 | Saha | .................. | G06F 16/2477 |
| 2022/0188383 A1* | 6/2022 | Doan Huu | ............. | G06N 20/00 |
| 2022/0335314 A1* | 10/2022 | Doan Huu | ............. | G06N 20/00 |
| 2022/0342910 A1* | 10/2022 | Dinh | ...................... | G06F 9/544 |
| 2023/0300151 A1* | 9/2023 | Xu | ...................... | H04L 63/1416 |
| | | | | 726/23 |
| 2023/0324860 A1* | 10/2023 | Taheri | .................... | G05B 15/02 |
| | | | | 700/275 |
| 2023/0342280 A1* | 10/2023 | Dar | ..................... | G06F 11/3485 |
| 2024/0119265 A1* | 4/2024 | Arik | ......................... | G06N 3/08 |
| 2024/0206755 A1* | 6/2024 | Shreim | ................ | A61B 5/7435 |

\* cited by examiner

FIG. 2A
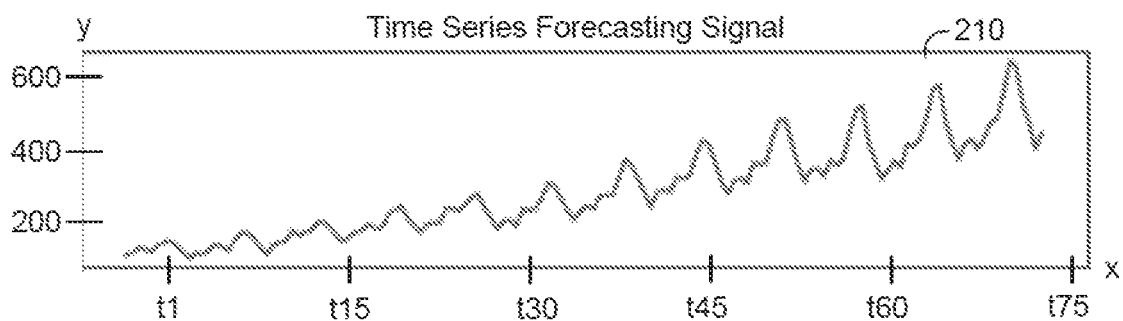
FIG. 2B
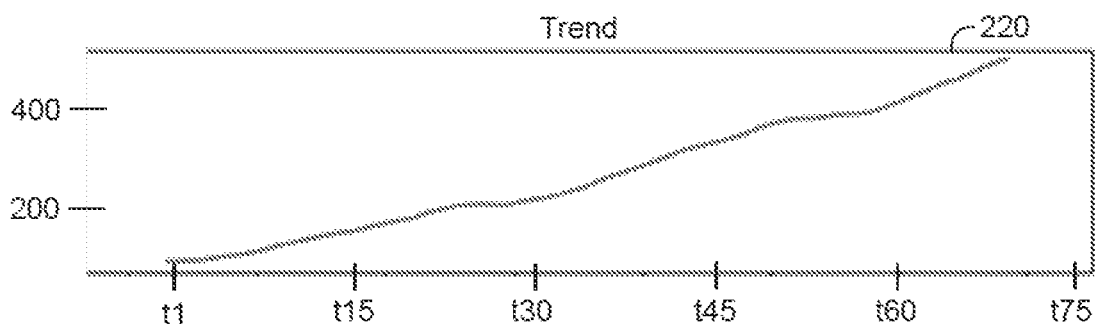
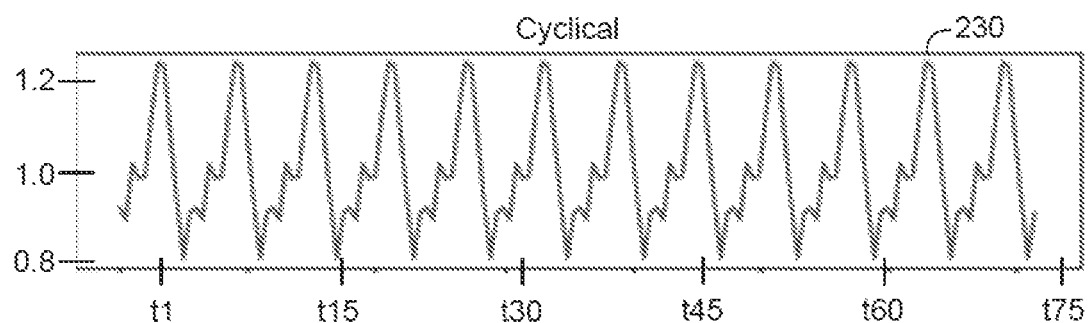
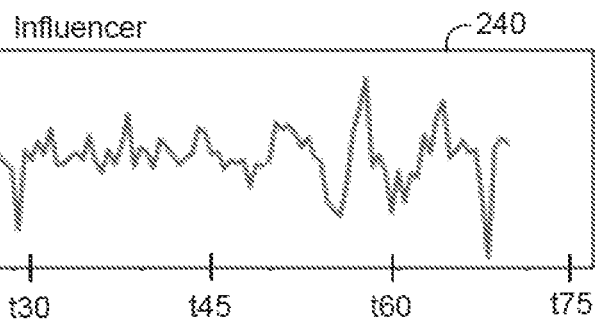

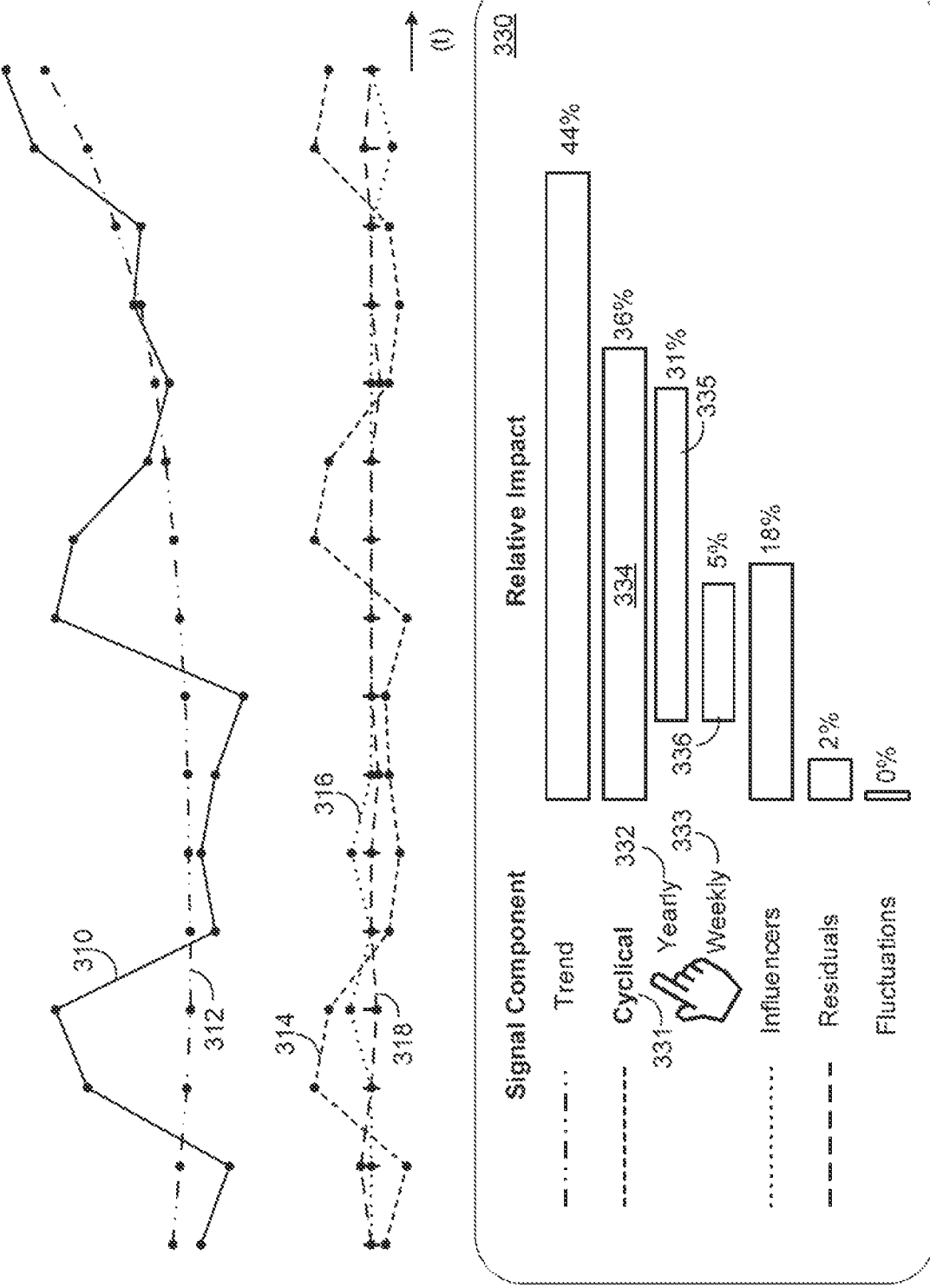

FIG. 4A

Additive 402

$$F(t) = Trend(t) + Cycle(t) + Influencers(t) + \ldots$$

Multiplicative 404

$$F(t) = Trend(t) * Cycle(t) * Influencers(t) * \ldots$$

Decomposition Table 410

| Horizon | Trend | Cycle | Influencers | Total |
|---|---|---|---|---|
| 1 | 3 | 2 | 1 | |
| 2 | -2 | -1 | 2 | |
| 3 | -1 | -2 | -1 | |
| 4 | 4 | -1 | -1 | |
| SUM (Abs) | 10 | 6 | 5 | 21 |

412   414   416   418

Contribution Table 420

| Component | Global Contribution | |
|---|---|---|
| Trend | 10 / 21 = 47.7% | 422 |
| Cycle | 6 / 21 = 28.5% | 424 |
| Influencers | 5 / 21 = 23.8% | 426 |

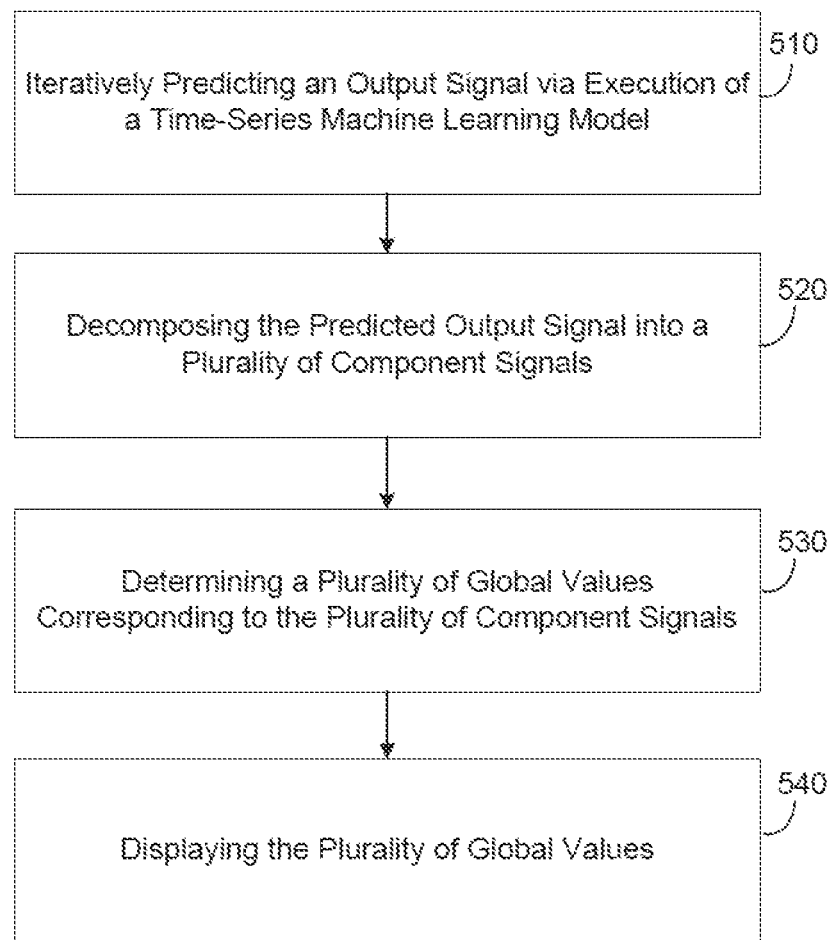

DETERMINING COMPONENT CONTRIBUTIONS OF TIME-SERIES MODEL

BACKGROUND

Time-series data contains sequential data points (e.g., data values) that are observed at successive time durations (e.g., hourly, daily, weekly, monthly, annually, etc.). For example, monthly rainfall, daily stock prices, annual profits, etc., are examples of time-series data. Forecasting is a machine learning process which can be used to observe historical values of time-series data and predict future values of the time-series data. There are numerous types of forecasting models including exponential smoothing which uses a weighted sum of past observations of the time-series to make predictions about future values of the data.

A predicted time-series value may be graphed as a plurality of data points over time and displayed on a user interface for an analyst or other user to visualize and possibly take actions according to the prediction. However, the graph by itself does not provide an analyst with an adequate understanding of what factors, within the model, are contributing to the predicted output value. Therefore, an analyst may have a difficult time understanding and interpreting the results output from the time-series forecasting model.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2A is a diagram illustrating a predicted output signal of a time-series forecasting model in accordance with an example embodiment.

FIG. 2B is a diagram illustrating different component signals included in the predicted output signal of FIG. 1, in accordance with an example embodiment.

FIG. 3B is a diagram illustrating a process of displaying global impact values of the different component signals of the time-series forecasting model in accordance with an example embodiment.

FIG. 4A is a diagram illustrating a process of generating a decomposition table for global contribution value determination in accordance with example embodiments.

FIG. 5 is a diagram illustrating a method of determining contribution values of a plurality of components of a time-series forecasting model in accordance with an example embodiment.

Figure 1:
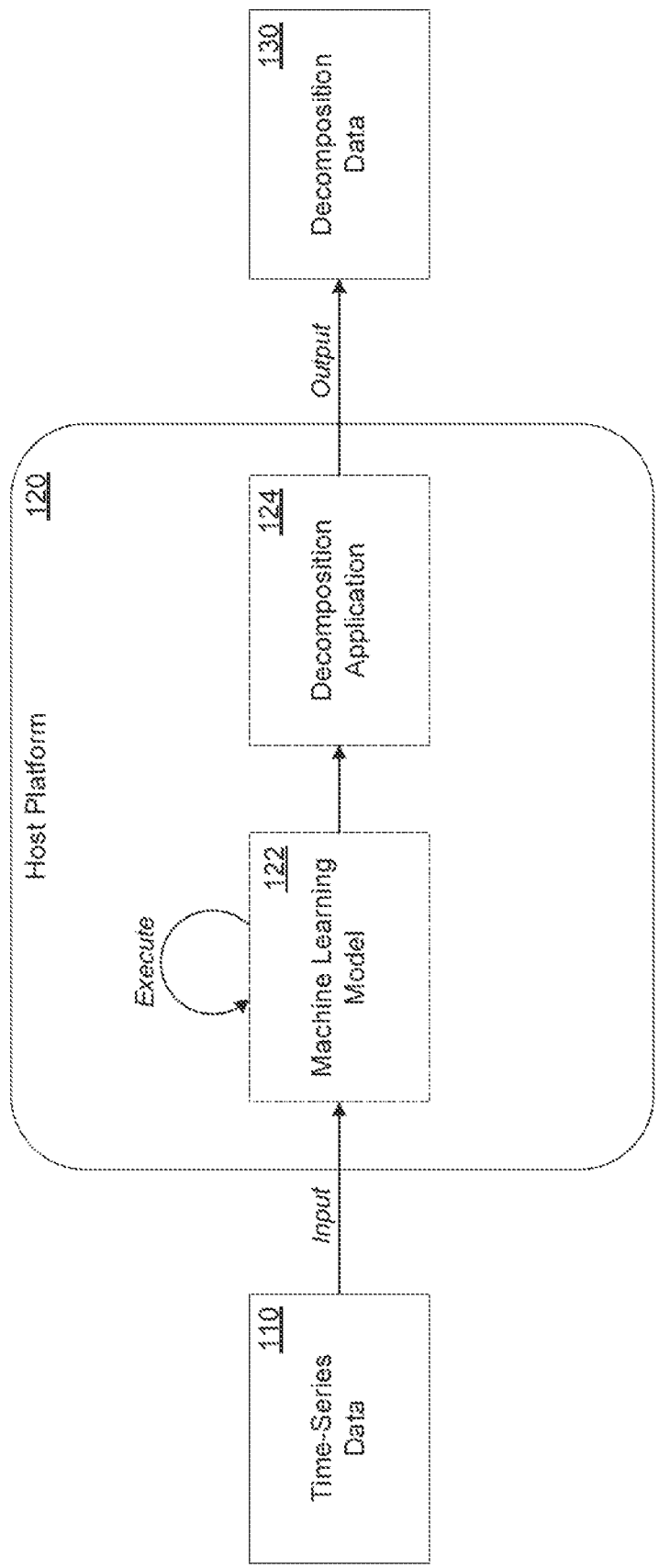
FIG. 1 is a diagram illustrating a process of executing a machine learning model and a decomposition application in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Time-series forecasting models are used to predict a single set of values of an item (e.g., cost, quantity, amount, intensity, etc.) recorded over equal time increments (e.g., minutes, days, hours, weeks, years, etc.) The models may support data properties that are frequently found in business applications such as trends, seasonality, fluctuations, residuals, and time dependence. Model features may be trained based on available historical data. The trained model can then be used to forecast future values for the data. Some examples of time-series forecasting models include exponential smoothing (ETS) and autoregressive integrated moving average (ARIMA) just to name a few.

A business analyst may build a time-series forecasting function for a period of time referred to as a horizon (h). The horizon may include a plurality of equal time increments with each increment being referred to as a unit of the horizon. For example, if a predictive model predicts the changes to sales of apples on a day-by-day basis, the horizon may be a week, with the time increments being individual days. In many cases, the prediction generated by the forecasting model may include a number of sequential horizons.

Decomposition refers to a process of decomposing a time-series forecasting model to understand how the time-series forecasting model has been built. The decomposition can be either additive or multiplicative. For additive decomposition, the contribution of each model component can be merely added up to obtain the final prediction value at each time increment. For example, an iteration of a time-series forecasting model may be graphed as a data point on a graph with the predicted value arranged on one axis of the graph (e.g., the y axis) and increments of time being arranged on the other axis (e.g., the x axis). This data point may be decomposed into a plurality of sub data points that represent different components of the time-series forecasting model including a trend component, a cyclical component (e.g., seasonality), a residual component, an influencer component, etc. at that increment of time. However, these components in their respective visual representation are often at significantly different scales with respect to each other. As a non-limiting example, a trend component may have a value that varies between −0.15 and 0.2 as it represents the slope of the signal variation per time unit while an influencer component may have a value that varies between −2000 and 2000 in the signal unit. This makes it difficult to compare the effects that each component has on the overall predicted output signal.

The example embodiments are directed to a decomposition process and system which can identify and visually inform a viewer of the global and relative contributions of different component of a time-series forecasting model. For example, an output signal (predicted value over time) can be decomposed into a plurality of sub-signals (one for each component). The sub-signals can be displayed along with the output signal in a signal decomposition graph that has one uniform scale for all components. Furthermore, the decomposition process can determine the global contribution values of the different components over a horizon of time or multiple horizons of time thereby providing a fuller understanding of the contribution of each component. The impact created by each component can be visually represented using graphical elements (e.g., bar graphs, etc.) and displayed along with the decomposition graph.

According to various embodiments, the system can estimate a global and relative contribution value of each component to the predicted output value (forecasted value) from an instant decomposition of a time-series forecasting model. Here, a contributive percentage can be assigned to each component (e.g., trend, cycles, fluctuations, residuals, etc.) with respect to the overall predictive output signal. The algorithm used to determine the contribution value may be an agnostic method that is derived from a proven mathematical foundation, a Shapley value. The contribution of each component can be determined from a plurality of units of time (e.g., a horizon) may adding together an absolute value of the component at each time increment. Furthermore, the method can be applied consistently on both additive and multiplicative decompositions. In some embodiments, a multiplicative decomposition can be converted into an additive decomposition using a conversion function. By using an absolute value, the system can ignore the direction of the contribution of a component (e.g., positive or negative) and instead consider only the amount of change at each time increment.

FIG. 1 illustrates a process 100 of executing a machine learning model 122 and a decomposition application 124 in accordance with an example embodiment. Referring to FIG. 1, a host platform 120, for example, a cloud platform, a web server, a user device, a database, or the like, may execute a machine learning model 122. As an example, the machine learning model 122 may be a time-series forecasting model such as ETS, ARIMA, or the like. Time-series data 110 may be input to the machine learning model 122. As an example, the time-series data 110 may include any kind of time-series data such as sales data, quantity data, sensor data (e.g., Internet of Things, etc.), and the like, which dynamically changes over time.

The host platform 120 may execute an iteration of the machine learning model 122 on the input data 110 to generate a data point of a predicted output signal. The predicted data point may include a measure of the value being predicted at a point in time, for example, a predicted sales quantity of apples for a particular day. The execution of the machine learning model 122 may be iteratively performed to generate a plurality of forecasted data points such as shown in the example of the time-series forecasting signal 210 shown in FIG. 2A. Here, each forecasted output (e.g., based on an execution of the machine learning model 122) creates a new data point of the time-series forecasting signal 210 at a next increment of time on the graph. The forecasts may include forecasts for multiple intervals of time equal to a horizon value (h) which may be a predetermined number that is set by a user or by a software program. As an example, the horizon may include three intervals, four intervals, five intervals, six intervals, seven intervals, and the like. Continuing with the example of the sales of apples, a horizon may be a week (7 days) and the predicted output value may include seven data points for the seven days of a week.

The time series forecasting signal 210 in FIG. 2A includes a combination/contribution from a plurality of different sub components represented by sub component signals 220, 230, and 240 shown in FIG. 2B. In this example, FIG. 2B illustrates a trend component 220, a cyclical component 230, and an influencer component 240. In the example of FIGS. 2A and 2B, the scale of each of the component signals 220, 230, and 240 differs from the scale of the time-series output signal 210. For example, the scale of the trend component signal 220 slightly differs from the scale of the time-series output signal 210. However, the scales of the cyclical component signal 230 and the influencer component signal 240 greatly differ from the scale of the time-series output signal. In particular, the influencer component signal varies from 1.1 to 0.9 while the time-series output signal varies from 600 to 100. Thus, it can be difficult to visualize the impact of the different sub-component signals on the overall predicted time-series output signal 210 in FIG. 2A.

Next, the host platform 120 may execute a decomposition application 124 on the predicted output signal of the machine learning model 122. The decomposition application 124 may identify individual contributions of each component from among a plurality of components of the time-series forecasting model on the overall predicted output value output by the time-series forecasting model. Examples of the components include a trend component, a cyclical component (e.g., seasonal, weekly, etc.), an influencer component, a fluctuation component, a residual component, and the like. The trend component represents the general pattern of the time-series forecasting output value over time. The cyclical component may be a recurring pattern within the predictive output signal that repeats itself every predetermined number of intervals (e.g., every week, every day, every month, etc.) The influencer component may be random (e.g., not predictable) and may not have logic associated therewith. For example, the influencer component may result from the occurrence of critical events, changes in the market, changes in price, and the like.

Figure 3A:
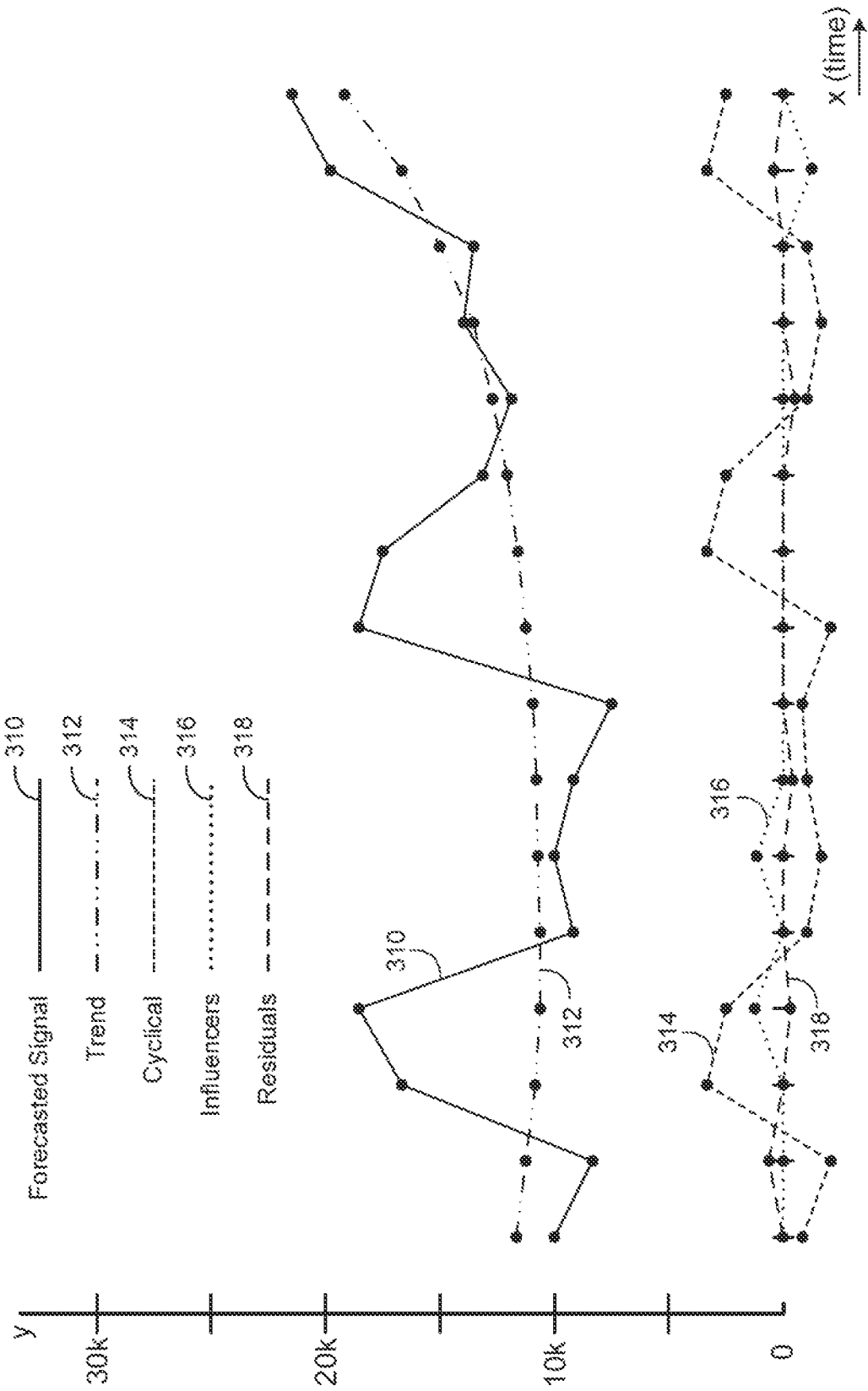
FIG. 3A is a diagram illustrating a graph displaying different component signals of a time-series forecasting model in accordance with an example embodiment.

The decomposition application 124 may display a graph of the predicted output signal graphed over time as well as graphs of the sub-signals (components) over time such as shown in the example of FIG. 3A and FIG. 3B.

FIG. 3A illustrates a graph 300A displaying different component signals of a time-series forecasting model in accordance with an example embodiment. Referring to FIG. 3A, a time-series forecasting model may predict an output signal 310 shown on the graph 300A. The graph 300A may be output via a user interface that is displayed in a web page, a mobile application, a web application, and the like. For example, the graph 300A may be output by the decomposition application 124 shown in FIG. 1. In this example, the output value that is being predicted is sales of an item in US dollars. The sales value represents the y-axis value of the predicted output and an increment of time (e.g., days) represents the x-axis value. As an example, the time-series forecasting model F(t) may be represented as follows for the additive variant:

$$F(t)=\text{Trend}(t)+\text{Cyclical}(t)+\text{Influencer}(t)+\text{Residuals}(t).$$

Here, the model includes a plurality of components (sub components) that contribute to the overall predicted output value including a trend component, a cyclical component, and an influencer component. Other components may include residual, fluctuation, random, etc. Each component may provide a partial contribution to the overall predicted output value at each increment of time.

In FIG. 3A, the trend component is represented by signal 312 and has a general pattern that is roughly the same scale as the predicted output signal 310. The cyclical component is represented by signal 314 and has a recurring pattern that occurs every predetermined number of sequences of time. The influencer component is represented by signal 316 and includes a random pattern that is not based on logic. Here, the influencer component may represent changes in the market, alerts or other breaks in normalcy of the data, price fluctuations, and the like. There are many possible influence components. Furthermore, the residuals from the timer-series forecasting model are represented by signal 318. The graph 300A differentiates from the different signals using broken line graphs. But it should be appreciated that colored lines may be used instead of broken line graphs, or any other visual differentiators such as changes to the width, etc. of the lines.

In this example, each of the cyclical component signal 314, the influencer component signal 316, and the residual component signal 318 have a different scale than the predicted output signal 310. However, the graph 300A is constructed by the system described herein such that each of the different signals (e.g., predicted output signal 310, trend signal 312, cyclical component signal 314, influencer component signal 316, and residual component signal 318 are displayed on a common axis have one scale.

FIG. 3B illustrates a process 300B of displaying global impact values of the different component signals of the time-series forecasting model in accordance with an example embodiment. Referring to FIG. 3B, in addition to displaying the graph 300A in FIG. 3A, the application (e.g., decomposition application) described herein may generate and output an impact window 330 which provides a graphical visualization/representation of the impact (contribution) of each component on the overall predicted output signal 310. In this example, the impact window 330 includes identifiers of the components which in this example is the names of the components (e.g., trend, cycle, influencers, residuals, and fluctuations). Each identifier is displayed next to its corresponding line graph. Furthermore, the plurality of bar graphs are aligned with and displayed next to the plurality of identifiers. Here, each identifier is paired with its corresponding bar graph. In addition, a percentage value which represents the global contribution of a component may also be displayed next to or inside of the bar graph.

According to various embodiments, the decomposition application may also generate a visualization of the (global contribution value) of each component. In this example, the visualizations are bar graphs, but the embodiments are not limited thereto. It should be appreciated that any shapes may be used such as lines, rectangles, squares, circles, etc., or multiple shapes arranged next to each other may be used. The size of the bar graph represents the contribution value in percentage. Here, the trend component signal 312 has the greatest contribution to the predicted output value signal 310. Therefore, the bar graph that corresponds to the trend component is the largest/widest bar graph in the group shown in the impact window 330 thereby enabling a viewer to quickly identify the component with the greatest impact.

The cyclical component signal 314 has the second greatest impact on the predicted output value signal 310. Accordingly, the cyclical component 314 (represented by identifier 331 in the impact window 330) has a corresponding bar graph 334 that is the second largest among the bar graphs in the impact window 330. Here, each bar graph is displayed adjacent and in alignment with its corresponding identifier. In other words, the bar graph 334 that represents the global contribution value of the cyclical component signal 314, is displayed adjacent to the identifier 331 of the cyclical component signal 314 in the impact window 330.

In some embodiments, the impact window 330 may be an interactive window that a user can interact with using a pointing device (e.g., a mouse, a finger, a pointer, a keyboard, etc.) Here, the user has moved a cursor onto the identifier 331 and selected it causing identifiers of sub-components of the cyclical component signal to be displayed underneath. Here, the sub-components of the cyclical component signal 314 include a yearly signal component and a weekly signal component represented with identifiers 332 and 333, respectively, in the impact window 330. Each sub-component may have a correspond bar graph (bar graphs 335 and 336) representing the global contribution values of the respective sub-component signals on the predicted output signal value 310.

FIG. 4A illustrates a process 400A of generating a decomposition table for global contribution value determination in accordance with example embodiments. Referring to FIG. 4A, the time-series forecasting model may be an additive algorithm 402 or a multiplicative algorithm 404. In either case, additive decomposition may be performed. For example, for a time-series forecasting model that includes a multiplicative algorithm such as algorithm 404, the multiplicative algorithm can be reformulated into an additive algorithm. Below is an example of such a conversion. Such conversion is useful as instant additive decomposition is a prerequisite of the proposed method to compute the relative global contribution of each component i.

$$F(t)=\text{Trend}(t)+((\text{Cyclical}(t)-1)*\text{Trend}(t))+((\text{Influencer}(t)-1)*\text{Cyclical}(t)*\text{Trend}(t))\ldots$$

Each additive component should depend only on the leftmost multiplicative component assuming that the multiplicative decomposition has an order: Then Cyclical then Influencer and so on. In above expression, the additive component related to the multiplicative Cyclical component is ((Cyclical(t)−1)*Trend(t)) and the additive component related to the multiplicative Influencer component is ((Influencer (t)−1)*Cyclical(t)*Trend(t)).

By converting the multiplicative algorithm into an additive algorithm, additive decomposition can be performed for each time increment.

The global contribution can be determined by generating a data structure (decomposition table 410) which is used to store instant contribution values of each component over a plurality of time increments referred to as a horizon. That is, the application can determine an additive decomposition for each component of the time-series forecasting signal to determine a global contribution value of each component for the predicted output value. The horizon may represent a subset of time in the predicted output signal. As an example, the predicted output signal may provide 31 days of data with 31 data points graphed over 31 points in time. Here, the horizon may be seven days which is a subset of the 31 days of the predicted output signal. Furthermore, multiple horizons (subsets) may exist in the predicted output signal. For example, days 1-7 may correspond to a first horizon, days 8-14 may correspond to a second horizon, days 15-21 may correspond to a third horizon, etc.

The construct the decomposition table 410, the application may insert or otherwise add values of each component at each increment of time for a predetermined number of increments of time (horizon). In this example, the horizon is four increments of time. At each increment, the component signal values change by increasing (+) or decreasing (−). For example, during a first increment of time, the trend component contribution value is three (3). During the second increment of time, the trend component contribution value decreases by two (−2). During the third increment of time, the trend component contribution value decrease by one (−). Each value (change in the component signal) from increment to increment may be stored in the table. Here, each component has its own dedicated column in the table 410. It should also be appreciated that different data structures may be used besides a table such as an array, a document, a spreadsheet, a file, or the like.

In the decomposition table 410, each row represents a different time increment with the last row (bottom row) representing a total or summation of values for the horizon. To generate the summation, the application uses absolute values and ignores the (+) or (−) associated with the individual component values. In other words, the application is only interested in the amount of change in the signal and not the direction (i.e., negative or positive). Therefore, a sum value 412 of the trend component signal for the horizon is ten (10), a sum value 414 of the cyclical component signal is six (6), and a sum value 416 of the influencer component signal is five (5). The total contribution value 418 of all signals is generated by adding the sum values 412, 414, and 416. In this example, the total contribution value is twenty-one (21).

To determine the global contribution value of each of the different components, the application can divide each of the sum values 412, 414, and 416, by the total contribution value 418 to arrive at the global contribution values 422, 424, and 426. Here, the global contribution values 422, 424, and 426, may be stored in a column of a contribution table 420. The contribution table 420 may also include another column with identifiers of the components displayed therein. Any of the decomposition table 410 and the contribution table 420 may be output via a user interface (for display) on a screen of a user device. As another example, the global contribution values 422, 424, and 426 may be output by themselves or as part of an application template.

Figure 4B:
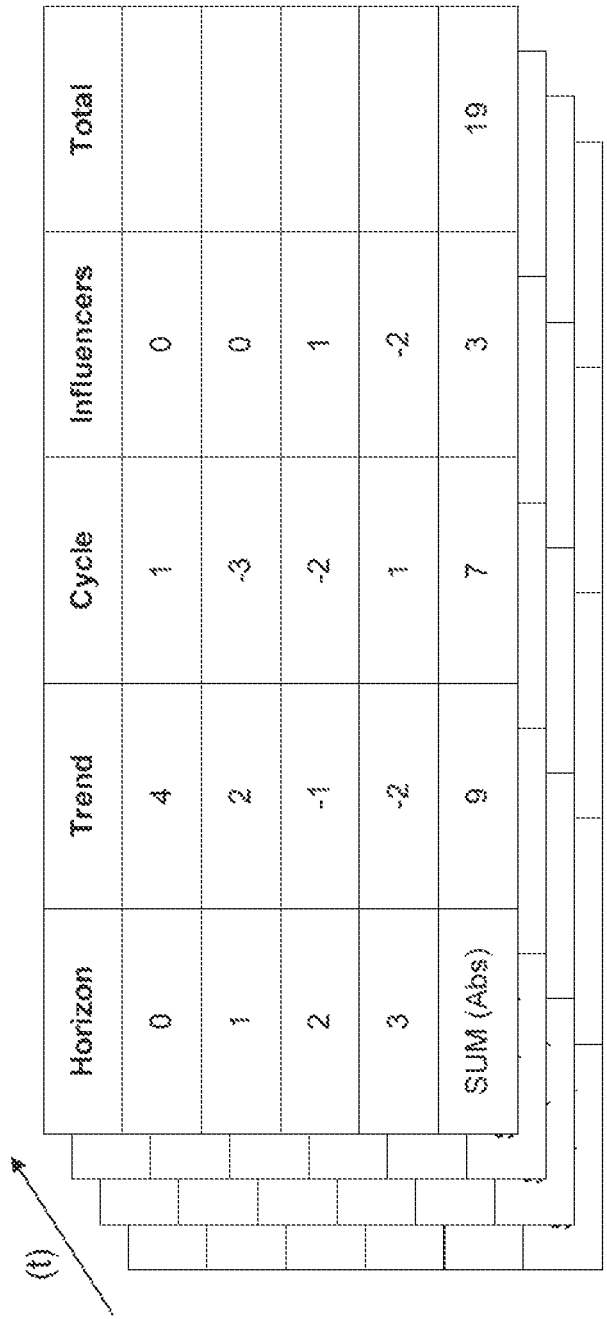
FIG. 4B is a diagram illustrating a process of determining multi-dimensional global contribution values for the plurality of component signals in accordance with an example embodiment.

FIG. 4B illustrates a process 400B of determining multi-dimensional global contribution values for the plurality of component signals in accordance with an example embodiment. In order to provide a more robust global contribution determination, the application may compute several decompositions for several horizons of time (e.g., subsets of data points). In this example, the horizons may include sequential and non-overlapping intervals of time. As noted above, the first horizon may be time units 1-7 while the second horizon may be time units 8-14. Here, the application may determine global contribution values using for a plurality of horizons by iteratively perform the process 400A described in FIG. 4A for different horizons.

In the example of FIG. 4B, global contribution values of the three component signals are determined for four iterations of time (four horizons) and are stored in a contribution table 430. Here, the identifier ($I_1$) represents the first iteration, the identifier ($I_2$) represents the second iteration, and so on. Here, the application may determine multi-dimensional global contribution values 432, 434, and 436 for the components by adding the global contribution values together and dividing by the number of intervals. The multi-dimensional global contribution values may be output for display.

FIG. 5 illustrates a method 500 a method of determining global contribution values of a plurality of components of a time-series forecasting model in accordance with an example embodiment. For example, the method 500 may be executed by a database node, a cloud platform, a server, a computing system (user device), a combination of devices/nodes, or the like. Referring to FIG. 5, in 510, the method may include iteratively predicting an output signal of a time-series data value via execution of a time-series machine learning model on input data. For example, the host platform may repeatedly execute a time-series machine learning model on input data to generate the predicted output signal. As a result of each iteration, the machine learning model may output one or more predicted data points of a data value in the future. The predicted output signal may be graphed over time with each predicted data point being associated with a time increment on the graph.

In 520, the method may include decomposing the predicted output signal into a plurality of component signals corresponding to a plurality of components of the time-series machine learning model, respectively. For example, the component signals may include one or more of a trend component, a cyclical component, an influencer component (e.g., random fluctuation component, etc.), a residual component, and the like. Each component signal may provide a partial contribution to the predicted output signal. The component signals may have different patterns, different scales, different values, and the like, with respect to each other. Here, the summation of the plurality of component signals at a point in time may be equal to the overall predicted output signal of the forecasting model at the point in time.

In 530, the method may include determining a plurality of global values corresponding to the plurality components signals, respectively, for a first subset of the predicted output signal, where a global value is determined based on an absolute value of a respective component signal within the first subset of the predicted output signal, and in 540, the method may include displaying the plurality of global values via a user interface. The first subset may be a first horizon within the predicted output signal. A horizon may be any desired size of time increments such as two or more data increments. The global values may correspond to the contribution values that each component signal provides to the predicted output signal. The global value may be a percentage between 0% and 1000%, where 100% represents the entire predicted output signal.

In some embodiments, the determining may include, for each component signal, identifying a plurality of partial values of the respective component signal within the first subset of the predicted output signal, and storing the plurality of identified partial values in a plurality of cells of a respective column in a data structure. In this example, the determining may further include converting the plurality of partial values of the component signal into a plurality of absolute partial values and determining a global value for the component signal based on the plurality of absolute partial values.

In some embodiments, the method may further include determining a plurality of additional global values corresponding to the plurality component signals, respectively, for a second subset of the predicted output signal that is different than the first subset of the predicted output signal. In some embodiments, the method may further include determining a plurality of multi-dimension global values for the plurality of component signals, respectively, based on the plurality of global values of the first subset of the predicted output signal and the plurality of different global values of the second subset of the predicted output signal.

In some embodiments, the method may further include constructing a plurality of bars corresponding to the plurality of global values of the plurality of component signals, respectively, and outputting the plurality of bars in a vertical arrangement via the user interface. In some embodiments, the decomposing may include decomposing the predicted output signal into the plurality of component signals based on additive decomposition. In some embodiments, the decomposing may further include converting a multiplicative time-series algorithm into an additive time-series algorithm, prior to decomposition of the predicted output signal.

Figure 6:
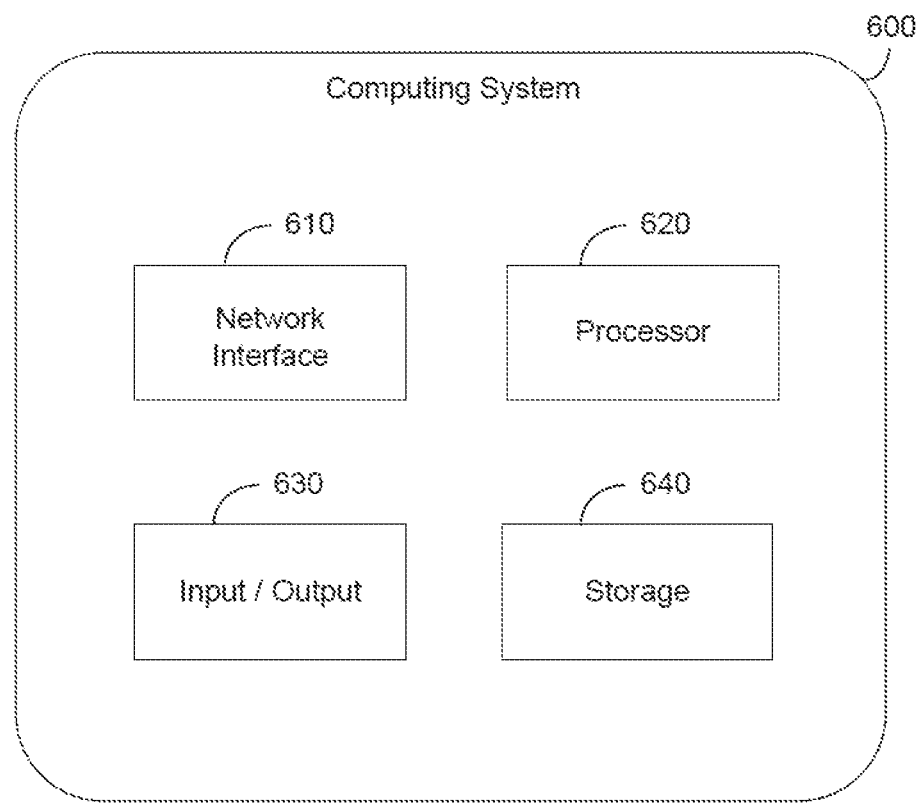
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 5. According to various embodiments, the storage 640 may include a data store having a plurality of tables, records, partitions and sub-partitions. The storage 640 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:

A hardware processor configured to: iteratively predict an output signal of a time-series data value via execution of a tine-series machine learning model on input data, decompose the predicted output signal into a plurality of component signals corresponding to a plurality of components of the time-series machine learning model, respectively, determine a plurality of global values corresponding to the plurality components signals, respectively, for a first subset of the predicted output signal, where a global value is determined based on an absolute value of a respective component signal within the first subset of the predicted output signal, and display the plurality of global values via a user interface, wherein the plurality of component signals comprise a trend signal, a cyclic signal, and a fluctuation signal within the time-series machine learning model, and the hardware processor is further configured to determine a plurality of additional global values corresponding to the plurality component signals, respectively for a second subset of the predicted output signal that is different than the first subset of the predicted output signal, wherein the first subset of the predicted output signal and the second subset of the predicted output signal are non-overlapping.

2. The computing system of claim 1, wherein for each component signal, the hardware processor is configured to identify a plurality of partial values of the respective component signal within the first subset of the predicted output signal, and store the plurality of identified partial values in a plurality of cells of a respective column in a data structure.

3. The computing system of claim 2, wherein the hardware processor is configured to convert the plurality of partial values of the component signal into a plurality of absolute partial values and determine a global value for the component signal based on the plurality of absolute partial values.

4. The computing system of claim 1, wherein the hardware processor is further configured to determine a plurality of multi-dimension global values for the plurality of component signals, respectively, based on the plurality of global values of the first subset of the predicted output signal and the plurality of different global values of the second subset of the predicted output signal.

5. The computing system of claim 1, wherein the hardware processor is configured to construct a plurality of bars corresponding to global values of the plurality of component signals, respectively, and output the plurality of bars in a vertical arrangement via the user interface.

6. The computing system of claim 1, wherein the hardware processor is configured to decompose the predicted output signal into the plurality of component signals based on additive decomposition.

7. The computing system of claim 6, wherein the hardware processor is configured to convert a multiplicative time-series algorithm into an additive time-series algorithm, prior to decomposition of the predicted output signal.

8. A method comprising: iteratively predicting an output signal of a time-series data value via execution of a time-series machine learning model on input data: decomposing the predicted output signal into a plurality of component signals corresponding to a plurality of components of the tine-series machine learning model, respectively: determining a plurality of global values corresponding to the plurality components signals, respectively, for a first subset of the predicted output signal, where a global value is determined based on an absolute value of a respective component signal within the first subset of the predicted output signal: and displaying the plurality of global values via a user interface, wherein the plurality of component signals comprise a trend signal, a cyclic signal, and a fluctuation signal within the time-series machine learning model, and the hardware processor is further configured to determine a plurality of additional global values corresponding to the plurality component signals, respectively for a second subset of the predicted output signal that is different than the first subset of the predicted output signal, wherein the first subset of the predicted output signal and the second subset of the predicted output signal are non-overlapping.

9. The method of claim 8, wherein the determining comprises, for each component signal, identifying a plurality of partial values of the respective component signal within the first subset of the predicted output signal, and storing the plurality of identified partial values in a plurality of cells of a respective column in a data structure.

10. The method of claim 9, wherein the determining further comprises converting the plurality of partial values of the component signal into a plurality of absolute partial values and determining a global value for the component signal based on the plurality of absolute partial values.

11. The method of claim 8, further comprising determining a plurality of multi-dimension global values for the plurality of component signals, respectively, based on the plurality of global values of the first subset of the predicted output signal and the plurality of different global values of the second subset of the predicted output signal.

12. The method of claim 8, wherein the method further comprises constructing a plurality of bars corresponding to the plurality of global values of the plurality of component signals, respectively, and outputting the plurality of bars in a vertical arrangement via the user interface.

13. The method of claim 8, wherein the decomposing comprises decomposing the predicted output signal into the plurality of component signals based on additive decomposition.

14. The method of claim 13, wherein the decomposing further comprises converting a multiplicative tine-series algorithm into an additive time-series algorithm prior to decomposition of the predicted output signal.

15. A non-transitory computer-readable medium comprising program instructions which when executed by a hardware processor cause the hardware processor to perform a method comprising: iteratively predicting an output signal of a time-series data value via execution of a time-series machine learning model on input data: decomposing the predicted output signal into a plurality of component signals corresponding to a plurality of components of the time-series machine learning model, respectively;

determining a plurality of global values corresponding to the plurality components signals, respectively, for a first subset of the predicted output signal where a global value is determined based on an absolute value of a respective component signal within the first subset of the predicted output signal; and displaying the plurality of global values via a user interface, wherein the plurality of component signals comprise a trend signal, a cyclic signal, and a fluctuation signal within the time-series machine learning model, and the hardware processor is further configured to determine a plurality of additional global values corresponding to the plurality component signals, respectively for a second subset of the predicted output signal that is different than the first subset of the predicted output signal, wherein the first subset of the predicted output signal and the second subset of the predicted output signal are non-overlapping.

\* \* \* \* \*